United States Patent
Boston et al.

(12) 
(10) Patent No.: US 6,530,859 B2
(45) Date of Patent: Mar. 11, 2003

(54) DRIVE ASSEMBLY WITH MOUNTING FOR ROTATING AXLE

(75) Inventors: Michael W. Boston, Eureka, IL (US); Randall R. Bendtsen, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/925,544

(22) Filed: Aug. 10, 2001

(65) Prior Publication Data

US 2003/0032521 A1 Feb. 13, 2003

(51) Int. Cl.[7] .................. B60K 17/04; F16H 1/36; F16B 7/00
(52) U.S. Cl. ............... 475/331; 180/372; 403/359.6
(58) Field of Search ................. 475/331, 221; 180/371, 372, 356; 403/359.1, 359.6

(56) References Cited

U.S. PATENT DOCUMENTS

| | | | | |
|---|---|---|---|---|
| 2,998,735 A | * | 9/1961 | Elfes | 180/372 |
| 3,800,901 A | | 4/1974 | Blomstrom et al. | |
| 4,037,694 A | | 7/1977 | Keese | |
| 4,091,689 A | | 5/1978 | Huffman | |
| 4,392,396 A | * | 7/1983 | Sato et al. | 475/343 |
| 4,407,382 A | | 10/1983 | Dziuba et al. | |
| 4,424,874 A | * | 1/1984 | Koike et al. | 180/370 |
| 4,424,879 A | | 1/1984 | Sonzogni | |
| 4,491,037 A | | 1/1985 | Bullock | |
| 4,574,658 A | * | 3/1986 | Abbott et al. | 475/331 |
| 4,714,130 A | * | 12/1987 | Ujita et al. | 180/262 |
| 4,932,281 A | * | 6/1990 | Ordo | 475/300 |
| 5,536,219 A | * | 7/1996 | Umemoto et al. | 475/225 |
| 5,862,890 A | | 1/1999 | Long et al. | |

FOREIGN PATENT DOCUMENTS

| | | | |
|---|---|---|---|
| FR | 2260032 A1 | * | 8/1975 |
| JP | 10058993 A | * | 3/1998 |

OTHER PUBLICATIONS

Caterpillar, "Systems Operating Testing & Adjusting", SENR5875, Nov. 1995.
Caterpillar, 980G Wheel Loader, 1996.

* cited by examiner

*Primary Examiner*—Ankur Parekh
(74) *Attorney, Agent, or Firm*—Finnegan, Henderson, Farabow, Garrett & Dunner; Steve M Hanley

(57) ABSTRACT

A final drive assembly for transmitting torque from a drive source to an output device is provided. The final drive assembly includes a non-rotatable housing, a rotatable shaft defining an outer surface, a gear assembly, at least one bearing assembly, and a bushing. The gear assembly is configured to be couple to the drive source. The gear assembly is coupled to the housing and coupled to the shaft through a rotatable member. The rotatable member is configured to transmit torque from the drive source to the shaft and to provide relative radial movement between the shaft and the rotatable member. The bearing assembly is coupled to the housing and configured to rotatably support the rotatable member. The bushing is radially disposed between the rotatable member and the outer surface of the shaft. The bushing, which is configured to transmit substantially all of an external load exerted on the shaft to the rotatable member, is fixedly coupled to one of the rotatable member or the shaft.

24 Claims, 3 Drawing Sheets

DRIVE ASSEMBLY WITH MOUNTING FOR ROTATING AXLE

TECHNICAL FIELD

This invention relates generally to a bearing mounting system for a rotating axle shaft in a final drive assembly and, more particularly, to a bearing mounting system for a rotating axle shaft of a final drive assembly that is capable of accommodating significant radial loads.

BACKGROUND

Almost every vehicle, including trucks, and farm and construction equipment, includes a final drive assembly that transmits torque from a motor to a driven device or implement. Final drive assemblies of such vehicles typically include inboard final drive assemblies or outboard final drive assemblies. An inboard final drive assembly is located adjacent to the differential. An outboard final drive assembly is typically located adjacent to the spindle and the wheel or other drive unit.

The inboard final drive assembly receives torque from the motor as input and transmits this torque, via, for example, a planetary gear carrier, to a rotating axle shaft. The bearings associated with an inboard final drive assembly are typically located between a stationary housing and the rotating axle shaft. These inboard final drive bearings allow the axle shaft to freely rotate, while at the same time supporting radial and thrust loads associated with external influences exerted on the rotating axle shaft. Thrust loads are those loads that act in a direction parallel to the longitudinal axis of the axle shaft. Radial loads are those loads that act in a direction perpendicular to the longitudinally axis of the axle shaft.

In general, the typical inboard final drive assembly transmits the drive torque from the planetary gear carrier to the axle shaft by spline coupling a rotating member of the planetary gear carrier to the rotating axle shaft. Typically, the axle shaft is directly supported by a pair of bearing assemblies, and thus, externally-applied radial loads experienced by the axle shaft are transmitted to the housing through the bearings. This configuration mitigates radial loads transmitted through the spline coupling. However, because of the limited accessible space on the axle shaft that is available for directly mounting the bearing assemblies to the shaft, this typical configuration results in the bearing assemblies being placed closer together than is optimal, and thus, the bearing assemblies are subjected to higher loads than is desirable.

In an alternative configuration, the separation between the pair of bearing assemblies may be increased by indirectly mounting one of the bearing assemblies to the shaft, i.e., one of the bearing assemblies is no longer mounted directly to the shaft, but rather is mounted to the shaft via an intermediate member, such as a hub connected to a planetary carrier. In this alternative configuration, the spline coupling is detrimentally exposed to the radial loads that would have been reacted by the bearing assembly if it were mounted directly to the axle shaft.

Moreover, during the rotation of the axle shaft, radial loads at the spline interface may not be uniformly distributed especially in view of the planet carrier having some radial movement during operation. When an externally-applied radial load is experienced by the axle shaft, the spline interface may be exposed to substantial alternating compressive and tensile forces as the spline coupling rotates through its 360 degree revolutions.

Thus, one problem with inboard final drive assemblies is how to maximize the distance between the bearing assemblies while at the same time limiting loads transmitted through the spline, thus protecting the spline coupling from damage or premature wear.

Spline couplings inherently include an amount of play or available movement between the splined parts. Implementing a spline coupling may result in significant radial load variance, which is difficult to predetermine, and thus oversized inboard and outboard bearings are necessary. These varying radial loads may be transmitted through the spline coupling in an imprecise manner to the bearing assemblies supporting the rotating axle shaft, thus also reducing the life of these bearing assemblies. Moreover, varying radial loads and spline coupling play introduce misalignment into the planetary gear carrier, which reduces the life of the planetary gear carrier.

External loads applied to the shaft of a conventional inboard final drive assembly are reacted by a pair of bearing assemblies. The greater the axial distance is between the bearing assemblies, the greater is the external load capability of the final drive assembly. Typically, the conventional inboard bearing assembly is not mounted at the very end of the shaft. Accordingly, this limits the distance between the pair of bearing assemblies, thus detrimentally limiting the external load capability of a typical conventional final drive assembly.

In contrast to the inboard final drive assembly previously discussed, the outboard final drive assembly receives torque from a rotating axle shaft and transmits this torque, via, for example, a planetary gear carrier, to the driven device. The bearings associated with an outboard final drive assembly are typically located between a rotating housing, which is attached to the driven device, and a stationary spindle. These outboard final drive bearings allow the driven device to freely rotate. Importantly, however, the spline coupling of the typical outboard final drive assembly is between a stationary spindle and a stationary member of the planetary gear carrier. Since the spline couplings of outboard final drive assemblies are stationary, they are generally not subjected to varying radial loads around all 360 degrees of the spline coupling, as contrasted to the rotating spline couplings of inboard final drive assemblies.

U.S. Pat. No. 4,491,037 to Bullock shows a rotating shaft spline coupled to a rotating member of a planetary gear assembly. A threaded washer is attached to a threaded portion of the rotating shaft and held in place with a threaded nut. The threaded washer is an assembly aid used to hold the planet carrier assembly to the axle group. The rotating axle is supported by the double-tapered bearing assembly, and externally-applied radial loads are reacted by this double-tapered bearing assembly.

Moreover, the inherent clearance and manufacturing tolerance of the threaded washer results in a significant amount of movement or play between the shaft and the threaded washer. Thus, the threaded washer is an unacceptable member for transmitting significant radial loads from the axle shaft to the bearing assembly on the planetary carrier.

There exists a need for a compact final drive assembly rotating axle mounting system that is capable of carrying large and varying loads, while reducing misalignment and premature wear. In particular, there exists a need for an inboard final drive assembly rotating axle mounting system that can be easily configured and withstand significant varying loads in a relatively compact space.

The present invention is directed to overcoming one or more of the problems or disadvantages associated with the prior art.

SUMMARY OF THE INVENTION

In one aspect of this invention, a final drive assembly for transmitting torque from a drive source to an output device is provided. The final drive assembly includes a non-rotatable housing, a rotatable shaft, a gear assembly, at least one bearing assembly, and a bushing. The shaft has an outer surface. The gear assembly has a rotatable member coupled to the shaft and is configured to transmit torque from the drive source to the shaft. The bearing assembly is coupled to the housing and configured to rotatably support the rotatable member. The bushing is radially disposed between the rotatable member and the outer surface of the shaft. The bushing, which is configured to transmit substantially all of a radial load transmitted from said shaft to said bearing assembly, is fixedly coupled to one of the rotatable member and the shaft.

In another aspect of the invention, a final drive assembly for transmitting movement from an input device is provided. The final drive assembly includes a stationary housing, a rotatable shaft, a planetary gear assembly, first and second bearing assemblies, and a bushing. The planetary gear assembly has an outer ring gear, a rotatable planetary carrier member, a sun gear, and a plurality of planetary gears. The outer ring gear is fixedly coupled to the stationary housing. The sun gear is configured for being drivingly coupled by the input device. The rotatable planetary carrier member is drivingly coupled to the rotatable shaft. The first bearing assembly is fixedly coupled to the stationary housing and fixedly coupled to the rotatable shaft. The first bearing assembly rotatably supports the rotatable shaft relative to the stationary housing. The second bearing assembly is axially displaced relative to the first bearing assembly. Moreover, the second bearing assembly is fixedly coupled to the stationary housing and fixedly coupled to the rotatable planetary carrier member. The second bearing assembly rotatably supports the rotatable shaft relative to the stationary housing. The bushing is radially disposed between the rotatable planetary carrier member and the rotatable shaft. The planetary carrier member is aligned relative to the rotatable shaft through the bushing.

In yet another aspect of the invention, a method for transmitting movement of an input source to a rotatable output member through a final drive assembly, which is subjected to an external load applied to the output member, is provided. The final drive assembly includes a planetary gear assembly supported within a housing. The method includes supporting the output member through a first bearing assembly, supporting a planetary carrier member of the planetary mechanism through a second bearing assembly, and transferring a portion of the external load to the housing through the planetary carrier member of the planetary gear assembly. Substantially all of the portion of the load being transferred between the planetary carrier member and the output member is directed through a bushing disposed between the planetary carrier member and the output member.

BRIEF DESCRIPTION OF THE DRAWINGS

The accompanying drawings, which are incorporated in and constitute a part of this specification, illustrate one embodiment of the invention and together with the description, serve to explain the principles of the invention.

DETAILED DESCRIPTION

Figure 1:
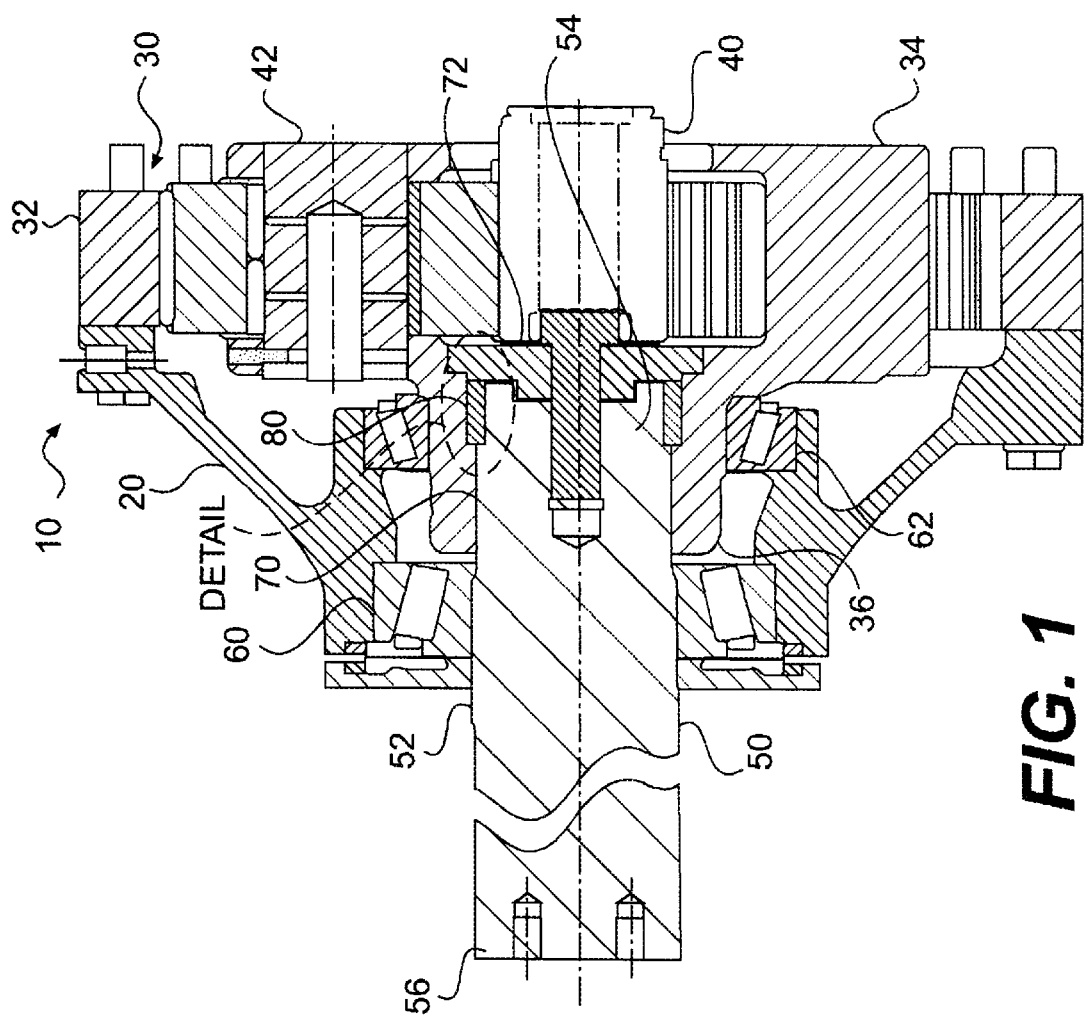
FIG. 1 is a sectional view of an embodiment of a final drive assembly constructed in accordance with an embodiment of the invention.

FIG. 1 illustrates an exemplary embodiment of a final drive assembly 10 according to the present invention. Final drive assembly 10 includes stationary housing 20, planetary gear assembly 30, rotating shaft 50, outer bearing assembly 60, inner bearing assembly 62, and bushing 80. Stationary housing 20 supports planetary gear assembly 30 and rotating shaft 50. Planetary gear assembly 30 is coupled to a drive or torque source, such as a motor (not shown).

Figure 2:
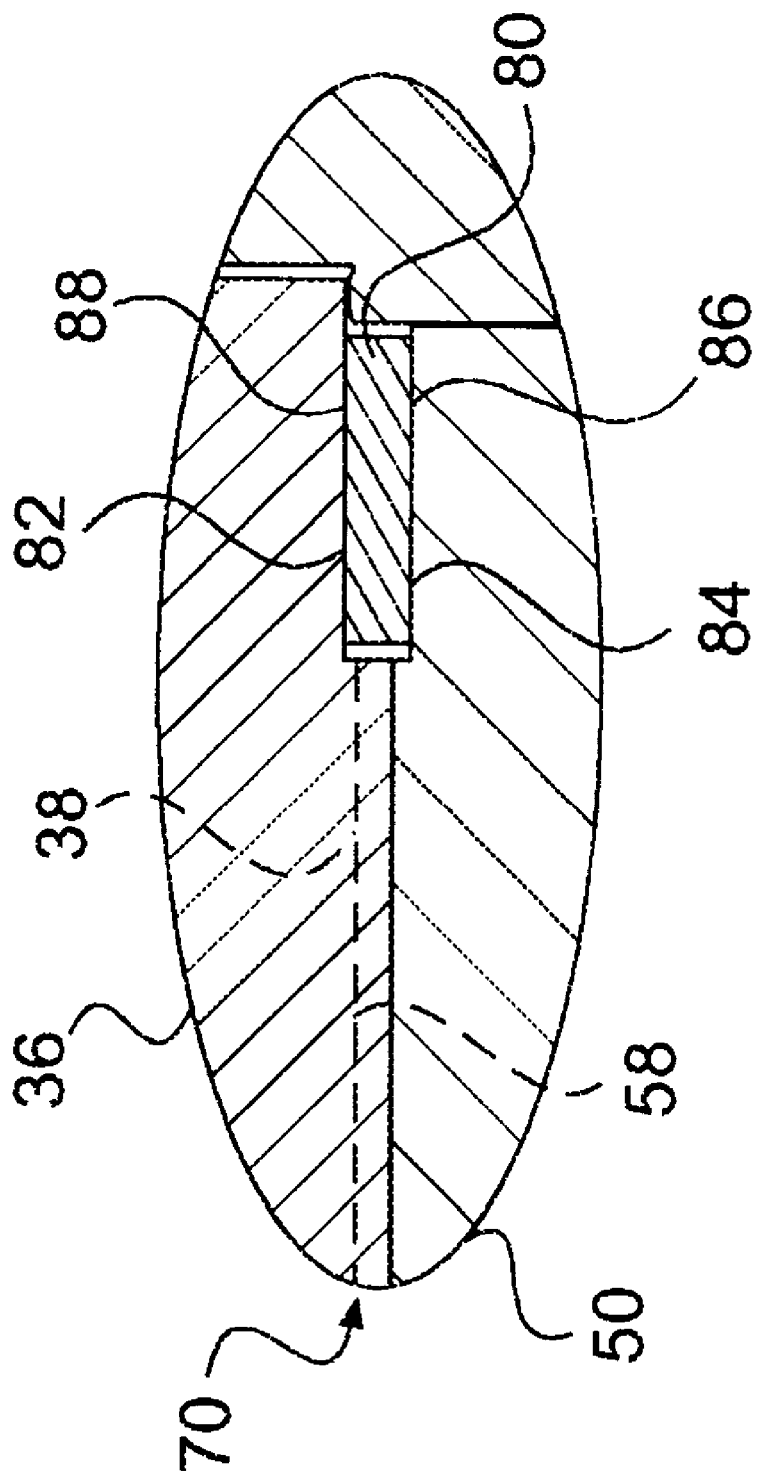
FIG. 2 is a sectional view of the detail (enlarged) of FIG. 1.

Planetary gear assembly 30 includes stationary ring gear 32 and rotatable carrier member 34. Stationary ring gear 32 is bolted to housing 20. Rotatable carrier member 34 includes rotating hub portion 36. With reference to FIG. 2, hub portion 36 of rotatable carrier member 34 extends over shaft 50 and includes spline element 38. Hub portion 36 is coupled to shaft 50 via spline element 38 at spline coupling 70. In addition, hub portion 36 includes bushing seating surface 82 for mounting bushing 80. Planetary gear assembly 30 also includes sun gear 40 and planetary gears 42. Typically, sun gear 40 is drivingly coupled to the drive source.

Although most typical inboard final drive assemblies include a planetary gear assembly for transmitting torque from a motor to the rotating axle shaft, non-planetary gear assemblies may be used.

Rotating shaft 50 includes outer surface 52, first end 54, and second end 56. Rotating shaft may be formed from any suitable material, as known to those skilled in the art. Outer surface 52 is cylindrical, and it may be stepped or not. First end 54 includes spline element 58 (FIG. 2). Spline element 58 of shaft 50 meshes with spline element 38 of hub portion 36 at spline coupling 70. In addition, first end 54 includes bushing seating surface 84 for mounting bushing 80. Second end 56 is adapted for direct or indirect coupling to a driven device or driven implement (not shown). In one exemplary embodiment of the invention, rotating shaft 50 is substantially solid and does not have a central throughbore.

Inboard final drive assembly 10 includes spline coupling 70 for radially engaging gear assembly 30 to rotating axle shaft 50. Spline couplings are relatively inexpensive and allow ease of assembly. However, other coupling devices may be used, such as, for instance, one or more keyways may be used to couple the gear assembly to the rotating shaft.

A retainer 72 is bolted to first end 54 of rotating shaft 50. Retainer 72 keeps spline element 38 of hub portion 36 axially aligned and meshed with spline element 58 of shaft 50.

Inboard final drive assembly 10 also includes outer bearing assembly 60 and inner bearing assembly 62. Outer bearing assembly 60 and inner bearing assembly 62 are supported within housing 20. Outer bearing assembly 60 is radially located between housing 20 and rotating shaft 50. Inner bearing assembly 62 is also radially located between housing 20 and shaft 50, but in addition, inner bearing assembly 62 is also radially located between housing 20 and hub portion 36 of rotating carrier member 34. Outer bearing assembly 60 is axially spaced from inner bearing assembly 62. Outer bearing assembly 60 and inner bearing assembly 62 allow shaft 50 to rotate relative to stationary housing 20.

Inner bearing assembly 62 and outer bearing assembly 60 may be standard, off-the-shelf, bearing assemblies or they may be bearing assemblies specially designed if required by a particular application. In an exemplary embodiment, bearing assemblies 60, 62 are conical roller bearing assemblies. These bearing assemblies may include balls, tapered rollers, cylindrical rollers, or any other bearing configuration known to those having ordinary skill in the art. In addition, these bearing assemblies may include pairs of single-race bearing assemblies or other such configurations suitable for the loads and the geometry constraints.

Figure 3:
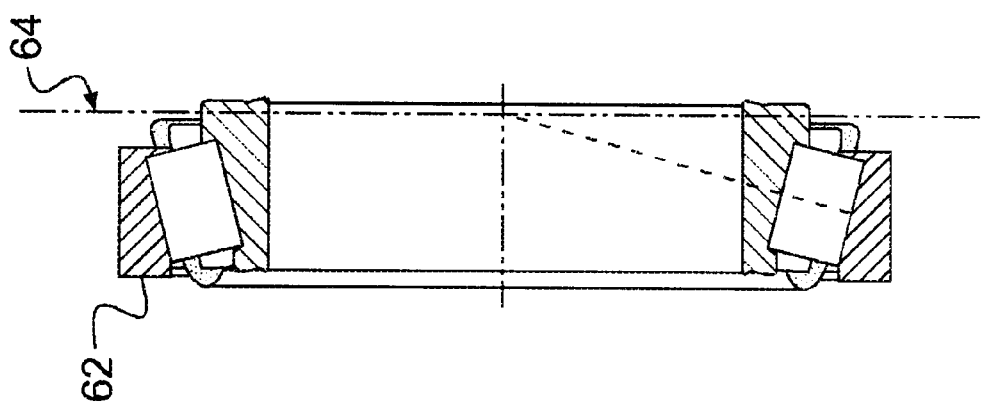
FIG. 3 is a sectional view of a tapered roller bearing schematically illustrating the location of the plane of the theoretical effective load center.

Inner bearing assembly 62 defines an effective load center 64. Referring to FIG. 3, the effective load center 64 is that plane where the support for the shaft is to be located if the bearing moment may be ignored when calculating radial loads on the bearing assembly. The bearing moment is defined as a moment imposed on the bearing assembly components due to asymmetrical axial components of the forces on the rollers.

For roller bearings, the effective load center 64 is located at the intersection of a line drawn perpendicular from the center of roller-cup contact with the bearing race (see dashed line of FIG. 3) and the centerline of the shaft. Standard bearing selection handbooks typically present tables of properties, including the location of the effective load center, for the available bearings.

Bushing 80 is a cylindrical tube, having inner diameter surface 86 and outer diameter surface 88. Bushing 80 may be formed of hardened steel or any other suitable load-carrying material. Bushing 80 provides a support for shaft 50.

According to one aspect of the invention, bushing 80 is located such that a theoretical line defining effective load center 64 of inner bearing assembly 62 passes through bushing 80. Locating bushing 80 under effective load center 64 of inner bearing assembly 62 acts to transfer a substantial portion of the radial loads of shaft 50 through bushing 80 and into inner bearing assembly 62. Locating bushing 80 under effective load center 64 of inner bearing assembly 62 reduces, and may eliminate, any radial loads that might otherwise pass through spline coupling 70.

According to another aspect of the invention, bushing 80 may be press fit onto one of hub portion 36 or shaft 50. Standard press fit tolerances may be applied to inner diameter surface 86 of bushing 80 and bushing seating surface 84 of shaft 50 or to outer diameter surface 88 and bushing seating surface 82 of hub portion 36 in order to achieve the press fit. However, non-standard press fit practices may be used, and any interference fit, including drive fits, force fits and or shrink fits, between bushing 80, hub portion 36 and shaft 50 is within the scope of the present invention.

Additionally, other techniques for achieving an interference fit are also within the scope of the present invention. For instance, thermal expansion/contraction of hub portion 36, bushing 80, and shaft 50 prior to assembly could produce an acceptable interference fit between hub portion 36, bushing 80, and shaft 50 upon thermal contraction/expansion of hub portion 36, bushing 80, and shaft 50 after assembling.

Moreover, any other suitable method for fixedly coupling the bushing to the rotating carrier member, to the rotating shaft, or to both is within the scope of the present invention. For instance, bonding, brazing or welding techniques may be used to fixedly couple the bushing to one or both of the rotating components.

According to yet another aspect of the invention, the inner or outer diameter surface of bushing 80 that is not subjected to an interference fit or otherwise fixedly coupled to either rotating carrier member 34 or rotating shaft 50 may be slidably coupled to the corresponding bushing seating surface 82, 84. For instance, if outer diameter surface 88 is press fit to hub portion 36, then inner diameter 86 may be provided with a sliding fit relative to shaft 50. Standard sliding fit tolerances may be applied to these corresponding slidably coupled surfaces in order to achieve the sliding fit. Alternatively, non-standard sliding fit tolerances, such as a slip fit that is highly controlled via ground high-precision surfaces, or any of a variety of running fits may also be used and still fall within the scope of the present invention.

By providing an interference fit between bushing 80 and at least one of the bushing seating surfaces 82, 84, substantially all of the radial loads transmitted from shaft 50 to inner bearing assembly 62 will pass through bushing 80. Accordingly, the spline fit between hub portion 36 and shaft 50 may be selected to provide insignificant radial interference between the hub portion and the shaft such that substantially all of the load transmitted from shaft 50 to inner bearing assembly 62 is transferred through bushing 80. Thus, radial loads, which would otherwise pass through spline coupling 70, can be mitigated or eliminated entirely.

As shown in FIG. 1, hub portion 36 and/or spline coupling 70 may be located adjacent, or even contacting, outer bearing assembly 60. This results in a more compact final drive assembly than could be achieved with a conventional final drive assembly that has an inner bearing assembly mounted directly on the shaft.

According to yet another aspect of the invention, bushing 80 provides an efficient mechanism for precisely aligning or positioning rotating shaft 50 relative to other components of final drive assembly 10. For instance, planetary carrier member 34 may be both radially and axially aligned relative to rotatable shaft 50 when assembled with bushing 80. Since, bushing 80 is fixedly coupled to at least one of the carrier member and the shaft, the amount of radial misalignment, and thus, the amount of play or non-concentric wobble between the rotating components, may be significantly reduced. Moreover, using bushing 80 to provide a precise radial alignment between planetary carrier member 34 and shaft 50 also provides an improved radial alignment between planetary carrier member 34 and, for instance, outer ring gear 32.

Industrial Applicability

The final drive assembly of FIG. 1 may be adapted for use as an inboard final drive assembly for any number of vehicles, such as, for example, an agricultural tractor. In particular, the final drive assembly of FIG. 1 may be especially suited for use in narrow gage final drives, or those final drives having limited axial space.

Planetary gear assembly 30 is bolted to housing 20 via outer ring gear 32. Housing 20 and outer ring gear 32 do not rotate. A motor or other torque-producing device (not shown) is coupled to sun gear 40 of planetary gear assembly 30. Sun gear 40 is meshed with one or more planetary gears 42 of planetary gear assembly 30. Planetary gears 42 are meshed with planetary carrier member 34, which in turn, is meshed with stationary outer ring gear 32.

When sun gear 40 is rotatably driven by the torque-producing device, planetary gears 42 are also rotatable driven, both around their own axes and around the axis of sun gear 40. The rotation of planetary gears 42 rotatably drives planetary carrier member 34 relative to stationary outer ring gear 32 and around the axis of sun gear 40.

Planetary carrier member 34 has cylindrically shaped hub portion 36, which fits over end portion 54 of shaft 50 through spline feature or spline element 38. Outer surface of shaft 50 has a complementary spline feature or spline element 58, which meshes with spline element 38 and spline coupling 70. The rotation of planetary carrier member 34 rotatably drives shaft 50. End portion 56 of shaft 50 is directly, or indirectly, coupled to an output device, such as a wheel or cog (not shown) for an agricultural tractor. Thus, torque is transmitted from sun gear 40 to an output device through the planetary gears 42 of the planetary carrier member 34 to shaft 50.

Spline coupling 70 is configured to transmit torque from hub portion 36 to shaft 50. However, in order to allow relatively easy assembly of hub portion 36 to shaft 50, these two parts are designed to have radial tolerances that allow hub portion 36 to easily slip relative to shaft 50. These tolerances may allow hub portion 36 to move radially relative to shaft 50.

Shaft 50 is rotatably supported by inner bearing assembly 62 and outer bearing assembly 60. In FIG. 1 these bearing assemblies are shown as standard, tapered roller bearing assemblies. Outer bearing assembly 60 is directly mounted between housing 20 and shaft 50. Outer bearing assembly 60 supports shaft 50, while at the same time allowing shaft 50 to rotate. Inner bearing assembly 62 is mounted between housing 20 and hub portion 36, and thus inner bearing assembly 62 indirectly supports shaft 50, while at the same time allowing shaft 50 to rotate.

In order to reduce the amount of undesirable radial movement between hub portion 36 and shaft 50 and also to focus and better define the radial load path from shaft 50 to inner bearing assembly 62, bushing 80 is placed between hub portion 36 and shaft 50. Bushing 80 rotates with shaft 50 and hub portion 36.

As shown in FIGS. 1 and 2, bushing 80 is press fit into hub portion 36. Or in other words, the outer diameter surface 88 of bushing 80 is slightly larger than the bushing seating surface 82 of at least a portion of hub portion 36. Bushing 80 is provided with a tightly controlled slip fit with respect to shaft 50. Hence, bushing 80 and hub portion 36 are fixedly engaged and bushing 80 and shaft 50 have a tightly controlled slip fit, whereas spline elements 38 and 58 are clearance fitted. Thus, the majority, if not all, of the radial loads transmitted from shaft 50 to inner bearing assembly 62 are transmitted through bushing 80, and not through spline coupling 70. Thus, the present invention is capable of carrying large and varying radial loads, while maximizing the life of the assembly components. Accordingly, with this configuration, smaller bearing assemblies 60, 62 may be used, which significantly decreases costs associated with purchasing, machining, handling, and storing a larger machine and/or final drive.

Moreover, since bushing 80 is utilized to support shaft 50 at first end 54, inner bearing assembly 62 need not be mounted directly on shaft 50 in order to support shaft 50. Rather, inner bearing assembly 62 may be radially located between housing 20 and rotating hub portion 36. Accordingly, the axial distance between inner bearing assembly 62 and outer bearing assembly 60 may be increased, without increasing the length of the shaft.

Increasing the axial distance between the inner and outer bearing assemblies 60, 62 provides a final drive assembly that can react greater external radial loads compared to a conventional final drive assembly occupying the same amount of space. For example, a conventional final drive assembly may have a distance between the inner and outer bearing assemblies of 185.5 mm and a distance between the axle shaft external radial load and the outer bearing assembly of 399.6 mm. In contrast, given the same distance between the external radial load and the outer bearing (399.6 mm) and given the same amount of space that the final drive assembly may occupy, an exemplary embodiment according to the present invention may provide an increased distance between the inner and outer bearing assemblies, such as 268 mm for example. Accordingly, for the same externally applied radial load, the load on the inner bearing assembly may be decreased by 44% and the load on the outer bearing assembly may be decreased by 27%, without needing to increase the overall size of the final drive assembly. Hence, the present invention may permit a significantly larger external radial load to be reacted, while utilizing the same size, or an even smaller, final drive assembly therefor.

Also as shown in FIG. 1, bushing 80 is positioned relative to inner bearing assembly so that it is located substantially under the effective load center of the bearing assembly. This positioning of bushing 80 focuses and better defines the loads experienced by inner bearing assembly 62, by essentially eliminating any bearing moments that inner bearing assembly 62 would otherwise experience.

It will be readily apparent to those skilled in this art that various changes and modifications of an obvious nature may be made, and all such changes and modifications are considered to fall within the scope of the appended claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A final drive assembly for transmitting torque from a drive source to an output device, said final drive assembly comprising:

a non-rotatable housing;

a rotatable shaft defining an outer surface;

a gear assembly having a rotatable member coupled to said shaft and configured to transmit torque from the drive source to said shaft;

at least one bearing assembly coupled to said housing and configured to rotatably support said rotatable member; and a bushing radially disposed between said rotatable member and said outer surface of said shaft, wherein said bushing, being configured to transmit substantially all of a radial load transmitted from said shaft to said bearing assembly, is fixedly coupled to one of said rotatable member and said shaft.

2. The drive assembly of claim 1, wherein said bearing assembly defines an effective load center and said bushing is located on said effective load center.

3. The drive assembly of claim 1, wherein said rotatable member is a carrier member of a planetary gear assembly.

4. The drive assembly of claim 3, wherein said bushing is provided with an interference fit relative to said carrier member.

5. The drive assembly of claim 4, wherein said interference fit is a press fit.

6. The drive assembly of claim 4, wherein said bushing is provided with a slip fit relative to said shaft.

7. The drive assembly of claim 6, wherein at least one of the complementary slip fit surfaces of the bushing and the shaft is high precision ground.

8. The drive assembly of claim 3, wherein said bushing is provided with an interference fit relative to said shaft.

9. The drive assembly of claim 8, wherein said interference fit is a press fit.

10. The drive assembly of claim 3, wherein said bushing is provided with an interference fit relative to said carrier member and an interference fit relative to said shaft.

11. The drive assembly of claim 1, wherein said bearing assembly includes a tapered roller bearing.

12. The drive assembly of claim 1, wherein said shaft is substantially solid.

13. The drive assembly of claim 1, wherein said bushing is formed of hardened steel.

14. A final drive assembly for transmitting movement from an input device, the final drive assembly comprising:
   a stationary housing;
   a rotatable shaft;
   a planetary gear assembly engaged with an outer ring gear, a rotatable planetary carrier member, a sun gear and a plurality of planetary gears, said outer ring gear attached to said stationary housing, said sun gear drivingly coupled by said input device, and said rotatable planetary carrier member drivingly coupled to said rotatable shaft;
   a first bearing assembly disposed between said housing and said rotatable shaft, said first bearing assembly rotatably supporting said rotatable shaft relative to said stationary housing;
   a second bearing assembly axially displaced relative to said first bearing assembly, said second bearing assembly disposed between said housing and said rotatable planetary carrier member, said second bearing assembly supporting said rotatable shaft through said planetary carrier member; and
   a bushing radially disposed between said rotatable planetary carrier member and said rotatable shaft,
   wherein said planetary carrier member is radially aligned relative said rotatable shaft and said housing.

15. The final drive assembly of claim 14, wherein said bushing is provided with an interference fit relative to said rotatable shaft.

16. The final drive assembly of claim 14, wherein said bushing is provided with an interference fit relative to said planetary carrier member.

17. The final drive assembly of claim 15, wherein said bushing is formed from hardened steel.

18. The final drive assembly of claim 14, wherein said second bearing assembly defines an effective load center and wherein said bushing is located on said effective load center.

19. The final drive assembly of claim 18, wherein said second bearing assembly is a tapered roller bearing assembly.

20. The final drive assembly of claim 14, wherein said rotatable planetary carrier member has at least one spline feature, said rotatable shaft has at least another spline feature, and said rotatable planetary carrier member and said rotatable shaft are drivingly coupled to each other via an interaction between said spline features.

21. The final drive assembly of claim 14, wherein said first bearing assembly is located adjacent said rotatable planetary carrier member.

22. The final drive assembly of claim 14, wherein said planetary carrier member is radially aligned with said outer ring gear and said rotatable shaft through said bushing.

23. A method for transmitting movement of an input source to a rotatable output member through a final drive assembly subjected to an external load applied to the output member, the final drive assembly including a planetary gear assembly supported within a housing, the method comprising:
   supporting the output member through a first bearing assembly;
   supporting a planetary carrier member of the planetary mechanism through a second bearing assembly; and
   transferring a portion of the external load to the housing through the planetary carrier member of the planetary gear assembly,
   wherein substantially all of a radial load that is transferred between the planetary carrier member and the output member is directed through a bushing disposed between the planetary carrier member and the output member.

24. The method of claim 23, further including causing the planetary carrier member to be aligned with a ring gear attached to the housing in response to the bushing, the planetary carrier member, and the output shaft being assembled.

* * * * *